United States Patent
Kiester et al.

(10) Patent No.: US 9,917,469 B2
(45) Date of Patent: Mar. 13, 2018

(54) VERTICAL ADJUSTABLE INDUCTIVE CHARGER PHONE ADAPTER

(71) Applicant: GM Global Technology Operations LLC, Detroit, MI (US)

(72) Inventors: Timothy A. Kiester, Sterling Heights, MI (US); Jason C. Bone, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 65 days.

(21) Appl. No.: 15/085,347

(22) Filed: Mar. 30, 2016

(65) Prior Publication Data

US 2017/0288441 A1   Oct. 5, 2017

(51) Int. Cl.
  *H02J 7/00*  (2006.01)
  *H02J 7/02*  (2016.01)

(52) U.S. Cl.
  CPC ............ *H02J 7/025* (2013.01); *H02J 7/0042* (2013.01)

(58) Field of Classification Search
  CPC ........ H02J 7/025; H02J 7/0044; H02J 7/0042; H02J 50/10; H02J 5/005; H02J 7/355
  USPC ......................... 320/108, 112, 113
  See application file for complete search history.

(56) References Cited

U.S. PATENT DOCUMENTS

| | | | | |
|---|---|---|---|---|
| 9,738,227 B2* | 8/2017 | Huebner | ................... | B60R 7/08 |
| 2009/0075704 A1* | 3/2009 | Wang | ..................... | H02J 7/025 |
| | | | | 455/573 |
| 2013/0049682 A1* | 2/2013 | Niec | ..................... | H02J 7/0044 |
| | | | | 320/108 |
| 2013/0134930 A1* | 5/2013 | Konkle | ................. | H02J 7/0027 |
| | | | | 320/108 |
| 2016/0072327 A1* | 3/2016 | Knutson | ............... | G06F 1/1632 |
| | | | | 320/108 |
| 2016/0105048 A1* | 4/2016 | Lee | .......................... | H02J 7/04 |
| | | | | 320/108 |

* cited by examiner

*Primary Examiner* — Nghia Doan
(74) *Attorney, Agent, or Firm* — BrooksGroup

(57) ABSTRACT

A number of variations may include a phone charger assembly that may include a housing assembly that may include a retainer body, a housing, a housing liner, a vent, and trim which may be constructed and arranged to house a cell phone. The housing may be dimensioned to store a multitude of cellphones in a vertical position. The phone charger assembly may further include a pawl assembly that may include a pawl ratchet, a plurality of screws, a pawl, and a release wherein the pawl assembly is constructed and arranged to raise and lower the housing within the phone charge assembly. Additionally, the phone charger assembly may include a gear rail assembly which may include at least one gear rail and at least one dampener. The gear rail assembly and pawl assembly may be constructed and arranged to raise and lower the housing within the phone charge assembly.

16 Claims, 3 Drawing Sheets

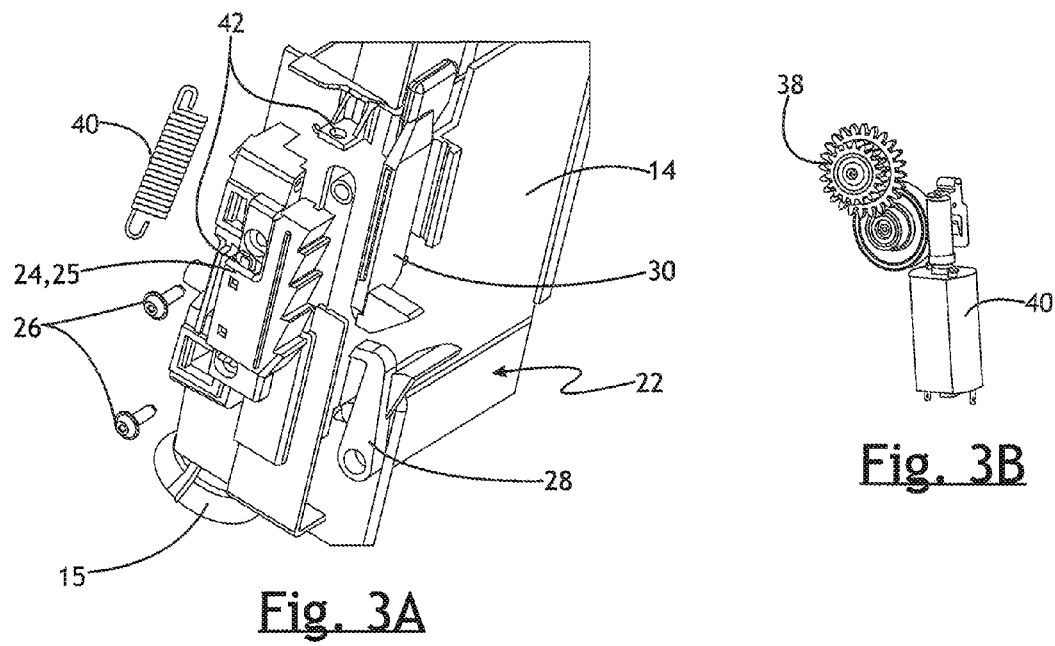
Fig. 3A
Fig. 3B
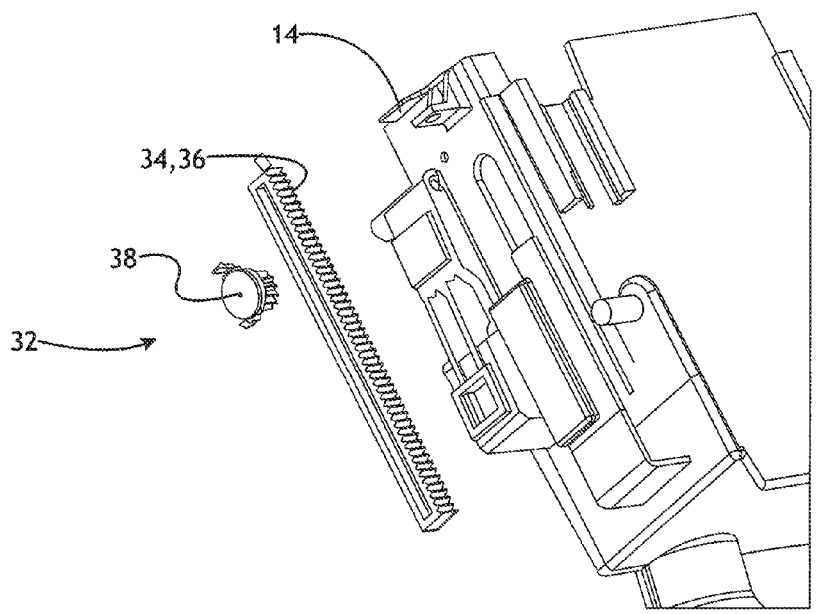
Fig. 4

VERTICAL ADJUSTABLE INDUCTIVE CHARGER PHONE ADAPTER

TECHNICAL FIELD

The field to which the disclosure generally relates includes inductive charging.

BACKGROUND

Vertically adjustable inductive phone chargers within vehicle consoles allow for varying sizes of phones to be charged within vertically adjustable inductive phone chargers.

SUMMARY OF ILLUSTRATIVE VARIATIONS

A number of variations may include a phone charger assembly that may include a housing assembly that may include a retainer body, a housing, a housing liner, a vent, and trim which may be constructed and arranged to house a cell phone. The housing may be dimensioned to store a multitude of cellphones in a vertical position. The phone charger assembly may further include a pawl assembly that may include a first pawl ratchet and a second pawl ratchet, a plurality of screws, at least one pawl, and at least one release wherein the pawl assembly is constructed and arranged to raise and lower the housing within the phone charge assembly. The first and second pawl ratchets may include angled steps constructed and arranged to lock the housing in a number of positions once the at least one pawl reaches each angled step. The at least one release may protrude from a portion of the trim and may be depressible such that the at least one pawl may be released from the first or second pawl ratchets and allowing the housing to a first highest position. Additionally, the phone charger assembly may include a gear rail assembly which may include a first gear rail and a second gear rail and at least one dampener. The gear rail assembly may be constructed and arranged to be in mechanical communication with the pawl assembly and to raise and lower the housing within the phone charge assembly.

A number of variations may also include a phone charger assembly that may include a housing assembly that may include a retainer body comprising a first wall opposite a second wall, a third wall opposite the fourth wall, a bottom wall and wherein the first, second, third, fourth wall, and bottom wall form a rectangular box defining a cavity constructed and arranged to receive a housing; the housing assembly further comprising a housing liner disposed within the housing, a vent defined by the bottom wall, and trim which may be constructed and arranged to house a cell phone. The phone charger assembly may further include a pawl assembly that may include at least a one pawl ratchet affixed to the first wall or the retainer via a plurality of screws, a pawl in communication with the at least one pawl ratchet, and at least one release in mechanical communication with the pawl and wherein the pawl assembly is constructed and arranged to raise and lower the housing within the phone charge assembly. The at least one pawl ratchet may include angled steps constructed and arranged to lock the housing in a number of positions once the at least one pawl reaches each angled step. The at least one release may protrude from a portion of the trim and may be depressible such that the at least one pawl may be released from the at least one ratchet and allowing the housing to a first highest position. Additionally, the phone charger assembly may include a gear rail assembly which may include at least one gear rail and at least one dampener. The gear rail assembly may be constructed and arranged to be in mechanical communication with the pawl assembly and to raise and lower the housing within the phone charge assembly.

A number of variations may also include a phone charger assembly that may include a housing assembly that may include a retainer body comprising a first wall opposite a second wall, a third wall opposite the fourth wall, a bottom wall and wherein the first, second, third, fourth wall, and bottom wall form a rectangular box defining a cavity constructed and arranged to receive a housing; the housing assembly further comprising a housing liner disposed within the housing, a vent defined by the bottom wall, and trim defining a through hole wherein the phone charger assembly may be constructed and arranged to house a cell phone. The phone charger assembly may further include a pawl assembly that may include at least a one pawl ratchet affixed to the first wall or the retainer via a plurality of screws, a pawl in communication with the at least one pawl ratchet, and at least one release in mechanical communication with the pawl and wherein the pawl assembly is constructed and arranged to raise and lower the housing within the phone charge assembly. The at least one pawl ratchet may include angled steps constructed and arranged to lock the housing in a number of positions once the at least one pawl reaches each angled step. The at least one release may protrude from a portion of the trim and may be depressible such that the at least one pawl may be released from the at least one ratchet and allowing the housing to a first highest position. Additionally, the phone charger assembly may include a gear rail assembly that may include at least a first gear rail and a second gear rail and at least a first dampener and a second dampener. The gear rail assembly may be constructed and arranged to be in mechanical communication with the pawl assembly and to raise and lower the housing within the phone charge assembly.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 3a depicts an exploded view of one variation of a pawl assembly for a vertically adjustable inductive phone charger;

FIG. 3b depicts one view of one variation of a motivator for a vertically adjustable inductive phone charger;

FIG. 4 depicts an exploded view of one variation of a gear rail assembly for a vertically adjustable inductive phone charger.

DETAILED DESCRIPTION OF ILLUSTRATIVE VARIATIONS

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Figure 1:
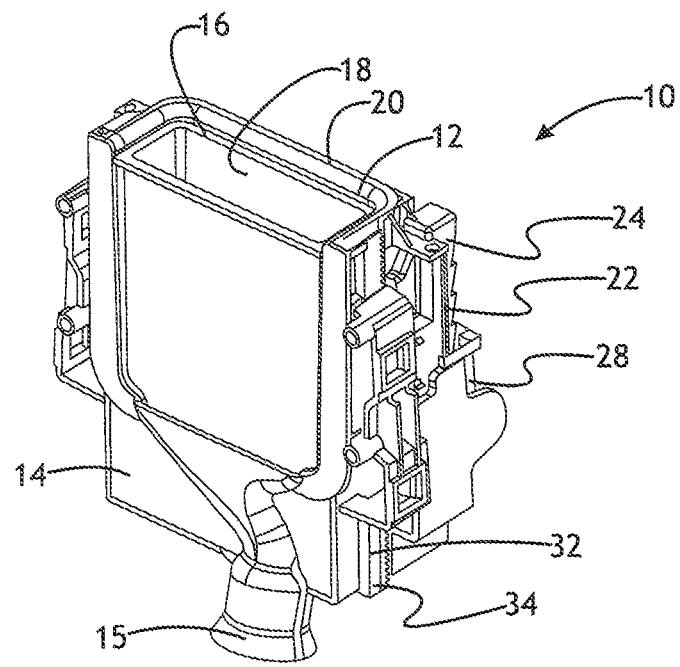
FIG. 1 depicts one variation of a vertically adjustable inductive phone charger.

Referring to FIG. 1, a phone charger assembly 10 may include a housing assembly 12 that may include a retainer body 14, a housing 16, a housing liner 18, a vent 15, and trim 20 which may be constructed and arranged to house a cell phone (not shown). The housing 16 may be dimensioned to store a multitude of cellphones in a vertical position. The phone charger assembly 10 may further include a pawl assembly 22 that may include a first pawl ratchet 24 and a second pawl ratchet 25, a plurality of screws 26, at least one pawl 28, and at least one release 30 wherein the pawl assembly is constructed and arranged to raise and lower the housing 16 within the phone charge assembly 10. The first and second pawl ratchets 24, 25 may include angled steps constructed and arranged to lock the housing 16 in a number of positions once the at least one pawl 28 reaches each angled step. The at least one release 30 may protrude from a portion of the trim 20 and may be depressible such that the at least one pawl 28 may be released from the first or second pawl ratchets 24, 25 and allowing the housing 16 to a first highest position. Additionally, the phone charger assembly 10 may include a gear rail assembly 32 which may include a first gear rail 34 and a second gear rail 36 and at least one dampener 38, 39. The gear rail assembly 32 may be constructed and arranged to be in mechanical communication with the pawl assembly 22 and to raise and lower the housing 16 within the phone charge assembly 10.

Figure 2:
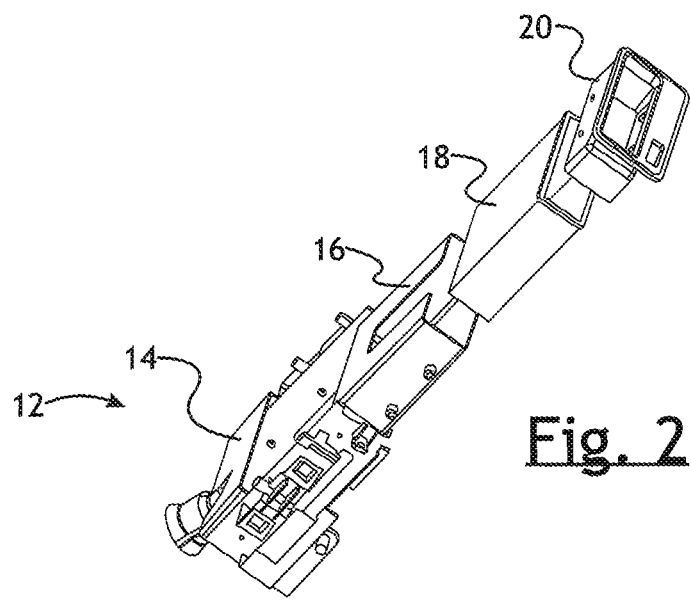
FIG. 2 depicts an exploded view of one variation of a housing assembly for a vertically adjustable inductive phone charger.

Referring to FIG. 2, a phone charger assembly 10 may include trim 20 nested within a housing liner 18 that may be nested within a housing 16 that may be nested within the housing assembly 12.

Referring to FIGS. 3a and 3b, a pawl assembly 22 may include a pawl assembly 22 that may include a first pawl ratchet 24 and a second pawl ratchet 25, a plurality of screws 26, at least one pawl 28, and at least one release 30 wherein the plurality of screws 26 may fix the first pawl ratchet 24 and second pawl ratchet 25 to the retainer body 14. The retainer body 14 may define at least one spring anchor 42. Similarly, the first pawl ratchet 24 and the second pawl ratchet 25 may each define at least one spring anchor 42. The at least one motivator 40, such as a spring, may be constructed and arranged to be mechanically attached to the at least one spring anchor 42 of the retainer body 14 and the at least one spring anchor 42 of the first pawl ratchet 24 or second pawl ratchet 25. Additionally, the at least one motivator 40 may be an electric motor in mechanical communication with the gear rail assembly 32 constructed and arranged to raise and lower within the phone charge assembly 10. The release 30 may be constructed and arranged to release the at least one pawl 28 from the first pawl ratchet 24 and a second pawl ratchet 25 thereby allowing the housing 16 to raise and lower within the phone charge assembly 10.

Referring to FIG. 4, a gear rail assembly 32 may be constructed and arranged to be in mechanical communication with the pawl assembly 22 and to raise and lower the housing 16 within the phone charge assembly 10. The gear rail assembly 32 may include a first and second gear rail 34, 36 and at least one dampener 38, 39 constructed and arranged to dampen and smooth the travel of the housing 16.

Figure 5:
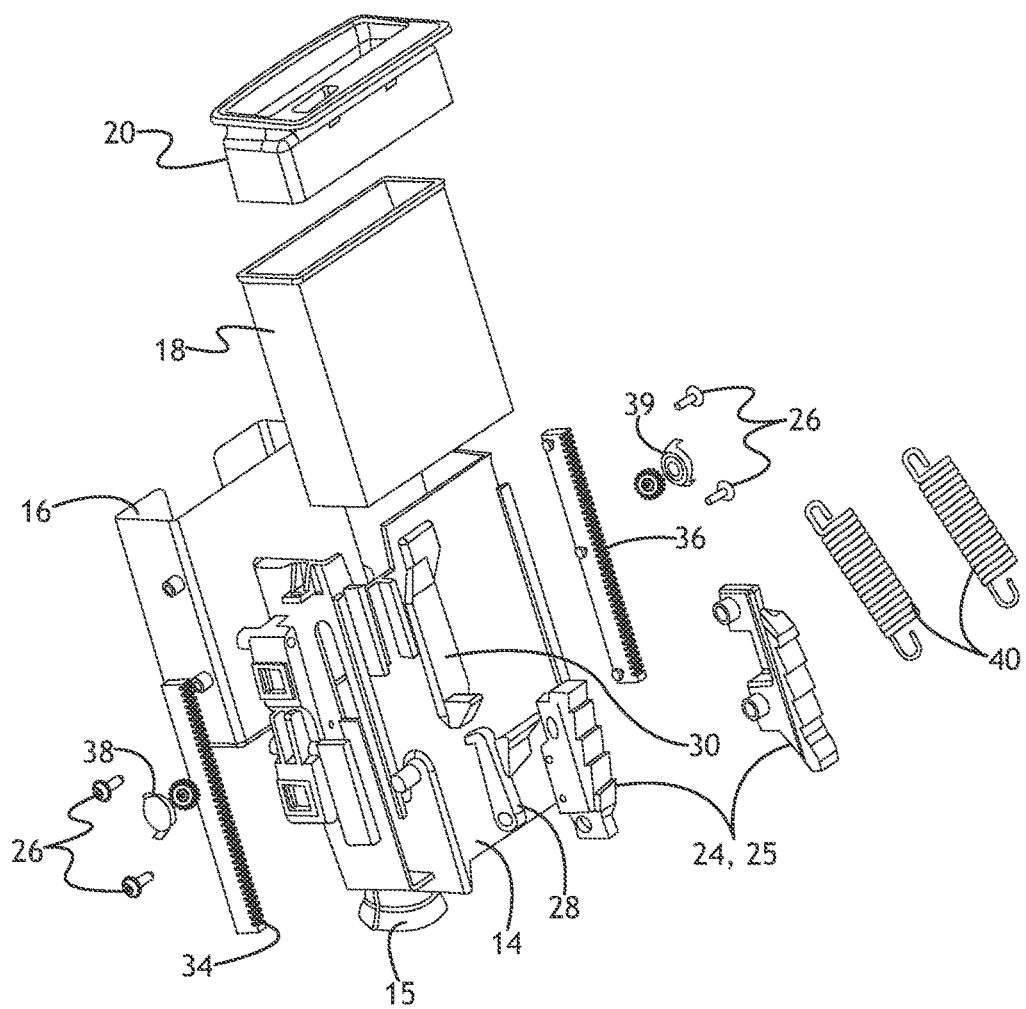
FIG. 5 depicts an exploded view of one variation of a vertically adjustable inductive phone charger.

Referring to FIG. 5, an exploded view of the phone charger assembly 10 shows the phone charger assembly 10, the pawl assembly 22, the housing assembly 12, and the gear assembly 32 and including all of the components listed above.

According to variation 1, a phone charger assembly may include a housing assembly that may include a retainer body, a housing, a housing liner, a vent, and trim which may be constructed and arranged to house a cell phone. The housing may be dimensioned to store a multitude of cellphones in a vertical position. The phone charger assembly may further include a pawl assembly that may include at least a one pawl ratchet, a plurality of screws, at least one pawl, and at least one release wherein the pawl assembly is constructed and arranged to raise and lower the housing within the phone charge assembly. The at least one pawl ratchets may include angled steps constructed and arranged to lock the housing in a number of positions once the at least one pawl reaches each angled step. The at least one release may protrude from a portion of the trim and may be depressible such that the at least one pawl may be released from the at least one ratchet and allowing the housing to a first highest position. Additionally, the phone charger assembly may include a gear rail assembly which may include at least one gear rail and at least one dampener. The gear rail assembly may be constructed and arranged to be in mechanical communication with the pawl assembly and to raise and lower the housing within the phone charge assembly.

Variation 2 may include a product as set forth in variation 1 wherein the pawl assembly may include at least a first pawl ratchet and a second pawl ratchet and at least a first pawl and a second pawl.

Variation 3 may include a product as set forth in variation 1 or 2 wherein the at least one pawl ratchets may include at least four angled steps.

Variation 4 may include a product as set forth in any of variations 1 through 3 wherein the trim may define a through hole through which the release may protrude.

Variation 5 may include a product as set forth in any of variations 1 through 4 wherein the gear rail assembly may include at least a first gear rail and a second gear rail and at least a first dampener and a second dampener.

Variation 6 may include a product as set forth in any of variations 1 through 5 wherein the vent is constructed and arranged to allow heat to dissipate from the housing assembly.

Variation 7 may include a product as set forth in any of variations 1 through 6 wherein the retainer body comprises a first wall opposite a second wall, a third wall opposite the fourth wall, a bottom wall and wherein the first, second, third, fourth wall, and bottom wall form a rectangular box defining a cavity constructed and arranged to receive the housing.

Variation 8 may include a product as set forth in variation 7 wherein the pawl assembly may include a first pawl assembly comprising a first pawl ratchet and a first pawl disposed on the first wall via the plurality of screws and a second pawl assembly comprising a second pawl ratchet and a second pawl disposed on the second wall via the plurality of screws.

Variation 9 may include a product as set forth in any of variations 7 through 8 wherein in the gear rail assembly may include at least a first gear rail and first dampener in mechanical communication with first pawl assembly and a second gear rail and a second dampener in mechanical communication with the second pawl assembly.

According to a tenth variation, a phone charger assembly may include a housing assembly that may include a retainer body comprising a first wall opposite a second wall, a third wall opposite the fourth wall, a bottom wall and wherein the first, second, third, fourth wall, and bottom wall form a rectangular box defining a cavity constructed and arranged to receive a housing; the housing assembly further comprising a housing liner disposed within the housing, a vent defined by the bottom wall, and trim which may be constructed and arranged to house a cell phone. The phone charger assembly may further include a pawl assembly that may include at least a one pawl ratchet affixed to the first wall or the retainer via a plurality of screws, a pawl in communication with the at least one pawl ratchet, and at least one release in mechanical communication with the pawl and wherein the pawl assembly is constructed and arranged to raise and lower the housing within the phone charge assembly. The at least one pawl ratchet may include angled steps constructed and arranged to lock the housing in a number of positions once the at least one pawl reaches each angled step. The at least one release may protrude from a portion of the trim and may be depressible such that the at least one pawl may be released from the at least one ratchet and allowing the housing to a first highest position. Additionally, the phone charger assembly may include a gear rail assembly which may include at least one gear rail and at least one dampener. The gear rail assembly may be constructed and arranged to be in mechanical communication with the pawl assembly and to raise and lower the housing within the phone charge assembly.

Variation 11 may include a product as set forth in variation 10 wherein the at least one pawl ratchets may include at least four angled steps.

Variation 12 may include a product as set forth in any of variations 10 through 11 wherein the trim may define a through hole through which the release may protrude.

Variation 13 may include a product as set forth in any of variations 10 through 12 wherein the gear rail assembly may include at least a first gear rail and a second gear rail and at least a first dampener and a second dampener.

Variation 14 may include a product as set forth in any of variations 10 through 13 wherein the vent is constructed and arranged to allow heat to dissipate from the housing assembly.

Variation 15 may include a product as set forth in any of variations 10 through 14 wherein in the gear rail assembly may include at least a first gear rail and first dampener in mechanical communication with first pawl assembly and a second gear rail and a second dampener in mechanical communication with the second pawl assembly.

According to variation 16, a phone charger assembly may include a housing assembly that may include a retainer body comprising a first wall opposite a second wall, a third wall opposite the fourth wall, a bottom wall and wherein the first, second, third, fourth wall, and bottom wall form a rectangular box defining a cavity constructed and arranged to receive a housing; the housing assembly further comprising a housing liner disposed within the housing, a vent defined by the bottom wall, and trim defining a through hole wherein the phone charger assembly may be constructed and arranged to house a cell phone. The phone charger assembly may further include a pawl assembly that may include at least a one pawl ratchet affixed to the first wall or the retainer via a plurality of screws, a pawl in communication with the at least one pawl ratchet, and at least one release in mechanical communication with the pawl and wherein the pawl assembly is constructed and arranged to raise and lower the housing within the phone charge assembly. The at least one pawl ratchet may include angled steps constructed and arranged to lock the housing in a number of positions once the at least one pawl reaches each angled step. The at least one release may protrude from a portion of the trim and may be depressible such that the at least one pawl may be released from the at least one ratchet and allowing the housing to a first highest position. Additionally, the phone charger assembly may include a gear rail assembly that may include at least a first gear rail and a second gear rail and at least a first dampener and a second dampener. The gear rail assembly may be constructed and arranged to be in mechanical communication with the pawl assembly and to raise and lower the housing within the phone charge assembly.

The above description of variations of the invention is merely demonstrative in nature and, thus, variations thereof are not to be regarded as a departure from the spirit and scope of the inventions disclosed within this document.

What is claimed is:

1. A product comprising:
    a phone charger assembly comprising a housing assembly comprising a retainer body, a housing, a housing liner, a vent, and trim constructed and arranged to house a cell phone;
    a pawl assembly comprising at least a first pawl ratchet, a plurality of screws, at least one pawl, and at least one release wherein the pawl assembly is constructed and arranged to raise and lower the housing within the phone charge assembly and wherein the at least one first pawl ratchet comprises angled steps constructed and arranged to lock the housing in a number of positions once the at least one pawl reaches each angled step and wherein the at least one release may protrude from a portion of the trim and is depressible such that the at least one pawl is released from the first pawl ratchet and thereby allowing the housing to a first highest position; and
    a gear rail assembly comprising at least a first gear rail and at least one dampener wherein the gear rail assembly is constructed and arranged to be in mechanical communication with the pawl assembly and to raise and lower the housing within the phone charge assembly.

2. A product as set forth in claim 1, wherein the pawl assembly comprises at least a first pawl ratchet and a second pawl ratchet and at least a first pawl and a second pawl.

3. A product as set forth in claim 1 further comprising at least one motivator in mechanical communication with the phone charger assembly constructed and arranged to raise and lower the retainer body with the phone charger assembly.

4. A product as set forth in claim 1 wherein the trim may define a through hole through which the release may protrude.

5. A product as set forth in claim 1 wherein the gear rail assembly comprises at least a first gear rail and a second gear rail and at least a first dampener and a second dampener.

6. A product as set forth in claim 1 wherein the vent is constructed and arranged to allow heat to dissipate from the housing assembly.

7. A product as set forth in claim 1 wherein the retainer body comprises a first wall opposite a second wall, a third wall opposite a fourth wall, a bottom wall and wherein the first, second, third, fourth wall, and bottom wall form a rectangular box defining a cavity therein constructed and arranged to receive the housing.

8. A product as set forth in claim 7 wherein the pawl assembly comprises a first pawl assembly comprising a first pawl ratchet and a first pawl disposed on the first wall via the plurality of screws and a second pawl assembly comprising a second pawl ratchet and a second pawl disposed on the second wall via the plurality of screws.

9. A product as set forth in claim 7 wherein in the gear rail assembly comprises at least a first gear rail and first dampener in mechanical communication with first pawl assembly and a second gear rail and a second dampener in mechanical communication with the second pawl assembly.

10. A product comprising:
a phone charger assembly comprising a housing assembly that comprises a retainer body comprising a first wall opposite a second wall, a third wall opposite the fourth wall, a bottom wall and wherein the first, second, third, fourth wall, and bottom wall form a rectangular box defining a cavity constructed and arranged to receive a housing;
the housing assembly comprising a housing liner disposed within the housing, a vent defined by the bottom wall, and trim constructed and arranged to house a cell phone;
a pawl assembly comprising at least a one pawl ratchet affixed to the first wall of the retainer via a plurality of screws, a pawl in communication with the at least one pawl ratchet, and at least one release in mechanical communication with the pawl and wherein the pawl assembly is constructed and arranged to raise and lower the housing within the phone charge assembly; the at least one pawl ratchet comprising angled steps constructed and arranged to lock the housing in a number of positions once the at least one pawl reaches each angled step wherein the at least one release protrudes from a portion of the trim and is depressible such that the at least one pawl is released from the at least one ratchet and allowing the housing to a first highest position; and
a gear rail assembly comprising at least one gear rail and at least one dampener and being constructed and arranged to be in mechanical communication with the pawl assembly and to raise and lower the housing within the phone charge assembly.

11. A product as set forth in claim 10 further comprising at least one motivator in mechanical communication with the phone charger assembly constructed and arranged to raise and lower the retainer body with the phone charger assembly.

12. A product as set forth in claim 10 wherein the trim defines a through hole through which the release may protrude.

13. A product as set forth in claim 10 wherein the gear rail assembly comprises at least a first gear rail and a second gear rail and at least a first dampener and a second dampener.

14. A product as set forth in claim 10 wherein the vent is constructed and arranged to allow heat to dissipate from the housing assembly.

15. A product as set forth in claim 10 wherein in the gear rail assembly comprises at least a first gear rail and a first dampener in mechanical communication with first pawl assembly and a second gear rail and a second dampener in mechanical communication with the second pawl assembly.

16. A product comprising:
a phone charger assembly comprising a housing assembly comprising a retainer body comprising a first wall opposite a second wall, a third wall opposite the fourth wall, a bottom wall and wherein the first, second, third, fourth wall, and bottom wall form a rectangular box defining a cavity constructed and arranged to receive a housing;
the housing assembly further comprising a housing liner disposed within the housing, a vent defined by the bottom wall, and trim defining a through hole wherein the phone charger assembly is constructed and arranged to house a cell phone;
a pawl assembly comprising at least a one pawl ratchet affixed to the first wall of the retainer via a plurality of screws, a pawl in communication with the at least one pawl ratchet, and at least one release in mechanical communication with the pawl and wherein the pawl assembly is constructed and arranged to raise and lower the housing within the phone charge assembly the at least one pawl ratchet further comprising angled steps constructed and arranged to lock the housing in a number of positions once the at least one pawl reaches each angled step and wherein the at least one release may protrude through the through hole of the trim and is depressible such that the at least one pawl is released from the at least one ratchet and allowing the housing to travel vertically a first highest position;
a gear rail assembly comprising at least a first gear rail and a second gear rail and at least a first dampener and a second dampener wherein the gear rail assembly is constructed and arranged to be in mechanical communication with the pawl assembly and to raise and lower the housing within the phone charge assembly; and
at least one motivator in mechanical communication with the phone charger assembly constructed and arranged to raise and lower the retainer body with the phone charger assembly.

* * * * *